E. S. ENSIGN.

WINDOW LOCK.

APPLICATION FILED FEB. 26, 1918.

Reissued Apr. 1, 1919.

14,623.

INVENTOR
EMORY S. ENSIGN
BY
A. T. Palmer

ATTY.

THE NORRIS PETERS CO., PHOTO-LITHO., WASHINGTON, D. C.

UNITED STATES PATENT OFFICE.

EMORY S. ENSIGN, OF EAST ORANGE, NEW JERSEY, ASSIGNOR TO ROSE ENSIGN, OF EAST ORANGE, NEW JERSEY.

WINDOW-LOCK.

14,623. Specification of Reissued Letters Patent. Reissued Apr. 1, 1919.

Original No. 1,255,398, dated February 5, 1918, Serial No. 152,420, filed March 3, 1917. Application for reissue filed February 26, 1918. Serial No. 219,329.

*To all whom it may concern:*

Be it known that I, EMORY S. ENSIGN, a citizen of the United States, residing at East Orange, in the county of Essex and State of New Jersey, have invented a new and useful Window-Lock, of which the following is a specification.

This invention relates to safety locks for windows or the like and has for its particular feature a resilient resistance to an improper opening pressure on the window sash to which it is applied. This resiliency is preferably supplied by a closely coiled spring having one end secured to the casing or stool of the window frame and the other end connected with the sash in such a manner that a limited opening movement is permitted without resistance, so that the window can be safely left partly open, for the purpose of ventilation. I do not limit myself to this mode of fastening, however, as the essential feature is the resilient resistance, and this could be obtained by reversing the fastenings.

I also preferably provide a locking device that will require a special tool for unlocking, and further add a noise-producer, as features of my invention.

In the drawings which accompany and form part of this specification,—

The window sash is marked 1, the casing 2 and the stool 3.

Figure 1:
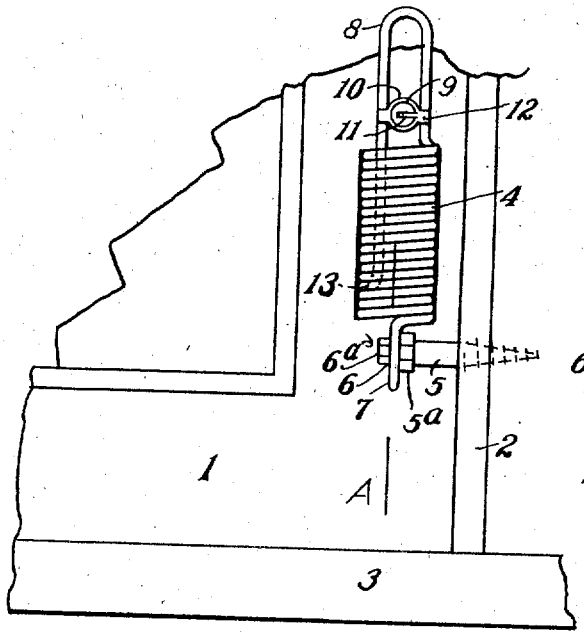
Figure 1 shows a fragment of a window with my preferred form attached.

Referring to Fig. 1, I show a closely coiled spring 4 secured at its lower end to a bolt or screw 5 which is fast in casing 2 and has a grooved collar 6 for engagement by the loop 7 of spring 4.

At its upper end, spring 4 has an upward extension formed with a loop 8 adapted to engage a bolt 9 secured to sash 1. This bolt 9 is preferably provided with a locking head 10 furnished with a key-slot 11 so that the lugs 12 may be turned vertical if the window is to be opened wide; this turning of lugs 12 permitting loop 8 to be disengaged from bolt 9. The free end of loop 8 is extended downward within the coil 4 and its tip is slightly bent outward, as at 13, so it will rasp on the coils of spring 4 when the latter is extended, to provide a noise-producing agency that will serve as a warning of improper manipulation.

The feature of this particular noise-producing agency lies in the fact that, as spring 4 is extended, each of the eighteen coils (as per drawing) will open by substantially the same amount; but each upward coil will extend for the sum of all the openings below it so, by reason of the fact that tip 13 is immediately connected with the upper coil, it will move the same distance as that coil and a substantially farther distance than the lower coils directly opposite. In this way, tip 13 will snap over several of the lower coils, with a metallic click as it passes each coil. Although this style of noise-producer is novel and preferable, I do not limit myself to such construction in combination with the resilient resistance, except within the scope of the appended claims.

Figure 2:
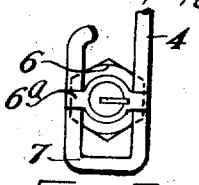
Fig. 2 is an enlarged, fragmental view, at right angles to Fig. 1.
Figure 3:
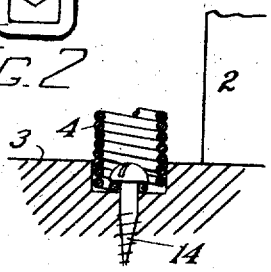
Fig. 3 is a fragmental view showing a stool attachment.

In Fig. 2, it will be noticed that collar 6 is preferably elongated in one direction, to prevent bolt 5 from being unscrewed while it is in engagement with loop 7. In Fig. 3, the coil 4 is sunk into the stool 3 and there secured by a concealed screw 14.

Figure 4:
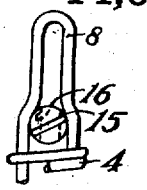
Figs. 4, 5, 6 and 7 show modifications.

In Fig. 4, I show the form to be used when a lock is not desired, bolt 15 having simply a vertical groove 16 which will release spring 4 only when in position shown, with window closed.

Figure 5:
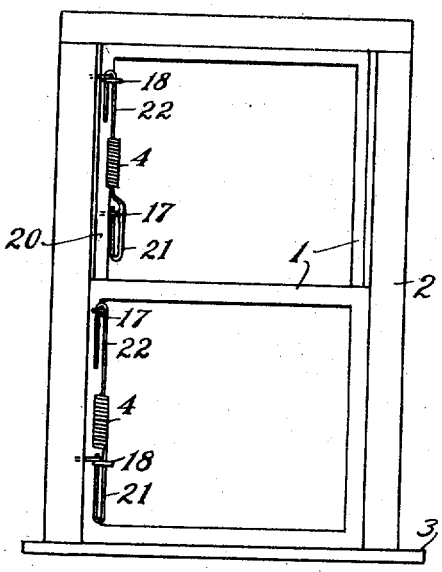
Figure 6:
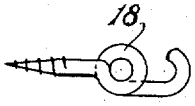

In Fig. 5 I show another form in which the spring may be entirely removed when not in use, by simply unshipping from the eyelets 17 and 18, the latter of which is shown double, as in Fig. 6.

For the upper sash, eyelet 18 would be secured to the parting strip 20. The action, without a noise-producer or lock, is precisely similar to that of Fig. 1, in effect, but a feature of construction lies in the fact that one loop, as 21, is slightly longer than the other, 22, to facilitate placement and removal.

In general, the particular value of using a closely coiled spring 4 is that it offers practically no opportunity for a cutting tool to sever any of the coils, besides being cheap and compact in structure. The feature of resiliency is chiefly valuable because it cushions any opening pressure and because lighter parts may be used in construction, and also because this resiliency is, in itself, a noise-producing agency, as it will immediately restore the positions of the parts when pressure is removed, and this restoration will be sudden if the opening bar should slip, and the consequent noise would be thus much more noticeable. Also, if a breaking pressure is applied, the resulting crash is greatly intensified by the resiliency of spring 4. Furthermore, it will be noticed that bolts 5 and 9 may be positioned so they can not be manipulated or gotten at from the outside, even when the window is open to the limit of loop 8.

Of course, loop 8 is not an essential feature and I do not limit myself, in general, to the precise construction illustrated.

In Figs. 1 and 2, it will be noticed that I have equipped bolt 5 with a locking arrangement similar to that shown for bolt 9. This is desirable in order to permit the spring 4 to be entirely removed from the casing, when not in use, thus leaving the bolts 5 and 9 as the only permanent fixtures. A special form of bolt 5 may be used where $5^a$ is a hex head and $6^a$ the lugs of the lock, similar to lugs 12, although it is understood that I do not limit myself to this form of lock.

Figure 7:
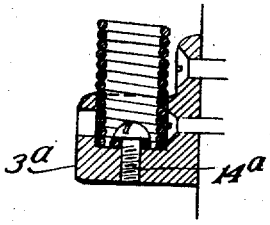

In Fig. 7, I show a modification of Fig. 3, where the bolt $14^a$ is secured to a casting $3^a$ which is, in turn, secured to the casing. In this way, I provide blind fastenings which may not be removed when the spring is in place.

What I claim is:—

1. A window lock comprising a spring; and means for so attaching said spring to a window sash and frame that the opening of said window will tax the resiliency of said spring; in combination with a noise-producer adapted for operation by said opening movement.

2. A window lock comprising a spiral spring; means for so attaching the ends of said spring to a window sash and frame that an opening movement of said sash will extend the coils of said spring; and a tongue mounted within said spring and adapted to rasp over a portion of said coils as they are extended.

3. A spiral spring; a stationary fastening for one end of said spring; a movable fastening for the opposite end of said spring; and a tongue adapted to rasp over some of the coils of said spring as said movable fastening is moved away from said stationary fastening.

4. A spiral spring; a stationary fastening for one end of said spring; a movable fastening for the other end of said spring; and a loop on said spring adapted to permit a limited free separation of said fastenings; in combination with a noise-producer adapted for operation by a further separation of said fastenings.

5. The combination of a window casing and a window sash operatively mounted therein; with a flexible window lock comprising a first fixture attached to the exterior of said casing; a second fixture attached to said sash; a spiral spring; an elongated loop at one end of said spring; means for mounting said spring exteriorly against said casing with said loop slidably connected to said second fixture and the opposite end of said spring connected with said first fixture; and means for maintaining said connections.

6. The combination of a window casing and a window operatively mounted therein, with a flexible window lock comprising a spiral spring capable of expansion; a fixture attached to said casing; a fixture attached to said window; means for slidably connecting one end of said spring directly with one of said fixtures; and means for directly connecting the other end of said spring with the other of said fixtures so that, when said window is closed, said spring is inactive.

In testimony whereof, I hereto affix my signature, in the presence of two witnesses.

EMORY S. ENSIGN.

Witnesses:
W. R. MAHER,
A. T. PALMER.

Copies of this patent may be obtained for five cents each, by addressing the "Commissioner of Patents, Washington, D. C."